July 22, 1924.
F. C. HAYES
SNOWPLOW
Filed July 30, 1921
1,502,430
2 Sheets—Sheet 2
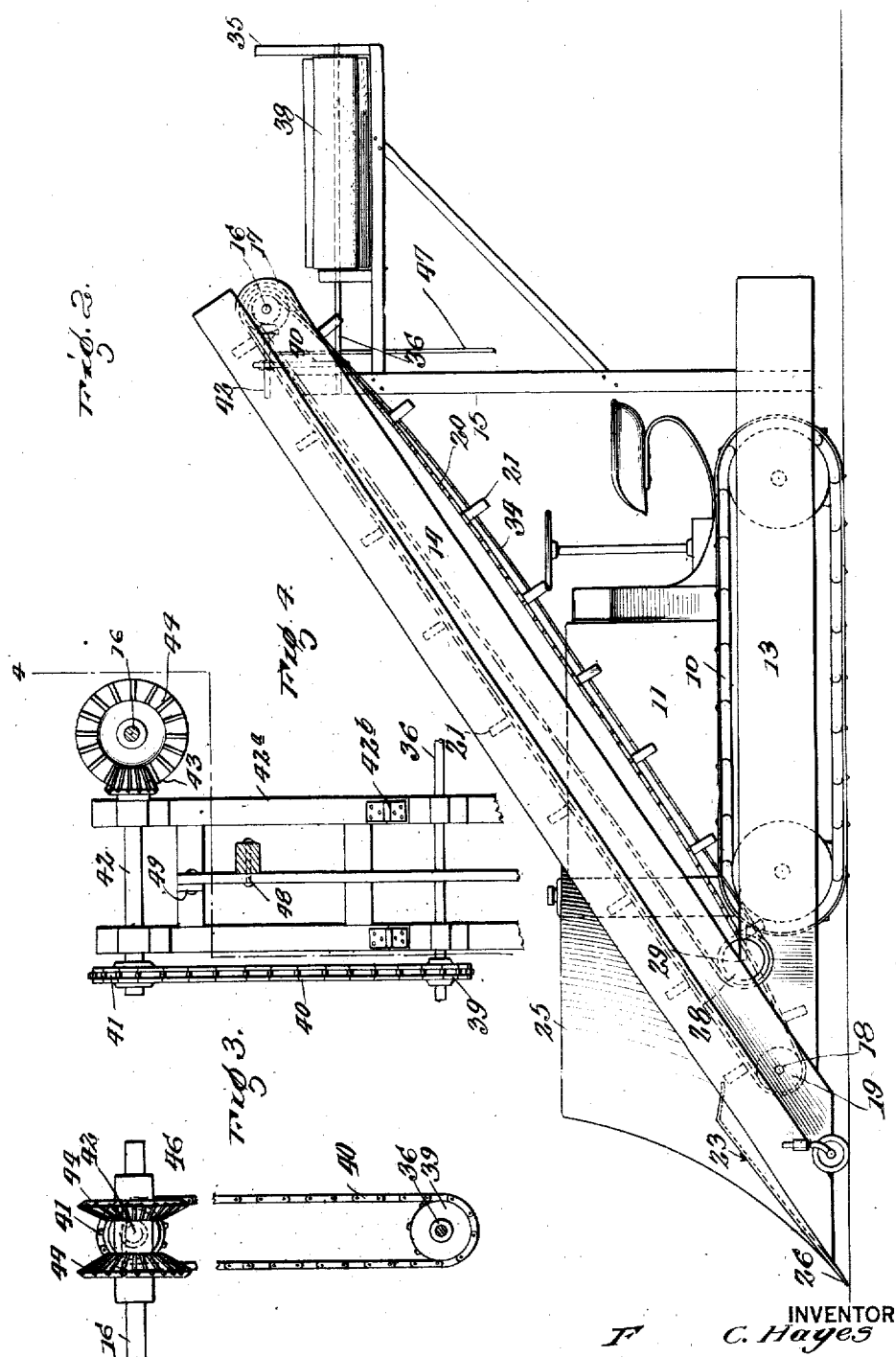
INVENTOR
F. C. Hayes
BY
ATTORNEY Patented July 22, 1924.

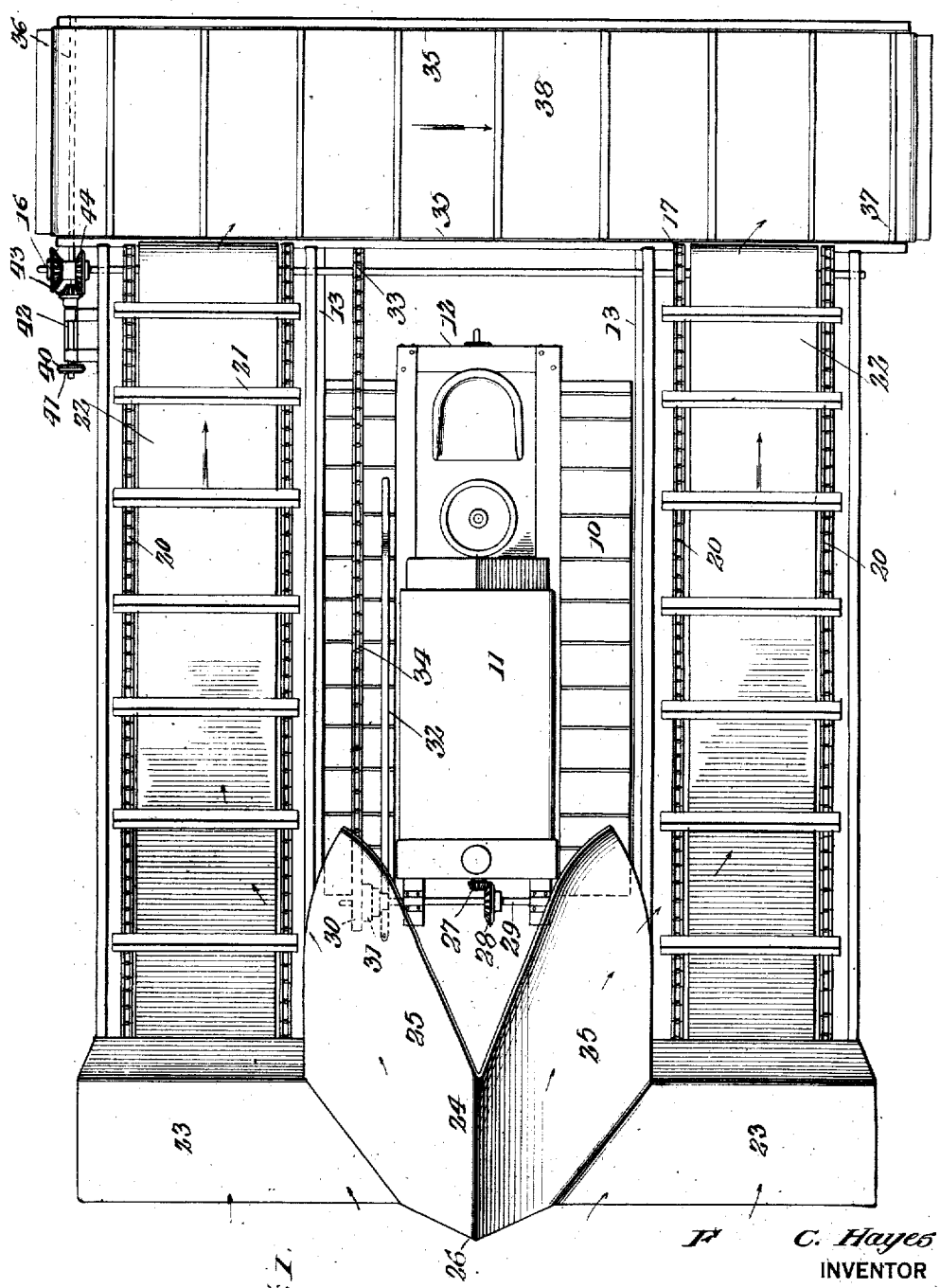

1,502,430

UNITED STATES PATENT OFFICE.

FAY C. HAYES, OF ALTAMONT, NEW YORK.

SNOWPLOW.

Application filed July 30, 1921. Serial No. 488,655.

*To all whom it may concern:*

Be it known that I, FAY C. HAYES, a citizen of the United States, residing at Altamont, in the county of Albany and State of New York, have invented certain new and useful Improvements in Snowplows, of which the following is a specification.

This invention has relation to snow plows, and has for an object to provide a machine intended to be supported upon a tractor and embodying a scoop, elevators to carry the snow upwards and rearwards and a lateral conveyor to discharge the snow upon the side of the pathway cleared by the machine.

In addition to the foregoing this invention comprehends improvements in the details of construction and the arrangement of parts to be hereinafter set forth and particularly pointed out in the appended claims.

In the accompanying drawings in which similar and corresponding parts are designated by the same characters of reference throughout the several views in which they appear;

Figure 1 is a view of the machine in top plan.

Figure 2 is a view thereof in side elevation, and

Figure 3 is a detail view of a reversing gear.

Figure 4 is a detailed view of the gear shifting mechanism for the conveyor.

With reference to the drawings, 10 indicates the endless supporting treads, 11 the engine and 12 the frame of a tractor of the caterpillar type. My invention consists of a machine to be superposed and supported upon such a tractor and comprises the main frame members 13 located one at each side of the tractor and supported thereupon in any suitable manner. Located at each side of the tractor is an elevator, each consisting of a pair of inclined frame bars 14, supported at their lower forward ends upon the members 13 and at their upper rear ends upon vertical struts 15. A horizontal, transverse shaft 16 is mounted in the upper ends of said bars 14 and rigidly mounted on said shaft are four sprocket wheels 17, two between each pair of bars 14. Mounted in the lower ends of the frame bars 14 are a pair of transverse shafts 18, and mounted on said shafts are sprocket wheels 19. Trained between the sprockets 17 and 19 are endless chains 20; a pair of such chains being located between each pair of bars 14. The chains of each pair are connected by means of transverse slats 21 forming part of the elevators, the slats when on the upper stretch traveling over platforms 22. Carried upon the forward ends of the frame bars 13 and 14 is a scoop consisting of the flat inclined portions 23, one of said portions being located at the lower end of each elevator. A dividing plow 24 forms a part thereof and is located between the flat portions and is formed with sloping sides 25 merging into the surfaces of the portions 23 and extending over the edges of the elevators, a point 26 being formed at the front end. The elevators are driven by the engine of the tractor and the mechanism may consist of a pinion 27 mounted on the crank shaft and meshing with a bevel gear 28 mounted upon a transverse shaft 29. A sprocket wheel 30 is loosely mounted upon said shaft and associated therewith is a clutch 31 of conventional type operated by a lever 32 to lock said sprocket 30 to the shaft at will to transmit power therebetween. A sprocket wheel 33 is mounted upon the shaft 16 and trained between the sprocket wheels is an endless chain 34. Located at the upper ends of the elevators is a horizontal conveyor consisting of the transverse frame members 35 supporting a pair of shafts 36 and 37, one at each end. An endless conveyor 38 is trained upon pulleys or the like mounted on said shafts. The conveyor is driven from the shaft 16 by means of a sprocket wheel 39 mounted on said shaft 36, an endless chain 40 operating over said wheel 39 and over a sprocket wheel 41 which is mounted upon a jack shaft 42. The shaft 42 is journalled upon a frame 42$^a$ which is hinged at 42$^b$ upon the main frame of the machine for lateral movement in a vertical plane. Mounted rigidly upon the shaft 16 is a pair of bevel gears 44, and mounted upon the shaft 42 is a bevel gear 43 for meshing engagement with either of the gears 44. This alternate engagement is effected by means of a lever 47 which is fulcrumed to the main frame at 48 and pivoted to the frame 42$^a$ at 49. Thus, by operating the lever the frame 42$^a$ may be rocked from one side to the other, thus engaging the pinion 43 with one or the other of the gears 44. In this manner the conveyor may be driven toward either side of the machine.

In operation, the machine is carried along by the tractor and the snow is gathered up by the scoop and deposited upon the elevators. The snow is carried up by the latter and deposited upon the conveyor 38 by which the snow is carried either to the right or the left of the machine, and then deposited upon the ground at the side of the passageway thus cleared by the machine. If desired a vehicle may be caused to travel with the machine and the snow deposited therein so that it may be carried elsewhere. When transporting the machine from place to place the clutch 31 may be disengaged, thus permitting the elevators and conveyor to remain idle.

While I have illustrated and described my invention with some degree of particularity I realize that in practice various alterations therein may be made. I therefore reserve the right and privilege of changing the form of the details of construction or otherwise altering the arrangement of the correlated parts, without departing from the spirit of the invention or the scope of the appended claims.

Having thus described my invention what I claim as new and desire to secure by United States Letters Patent is.

1. In combination, a tractor, a main frame supported by the tractor, vertical struts and inclined elevators supported by the main frame on each side of the tractor, a dividing plow carried at the front end of the main frame, a scoop on each side of the plow and at the lower ends of the respective elevators, means for driving said elevators, by the tractor, a horizontal conveyor supported by the struts and disposed at the upper end of the elevators, means for operating the conveyor and gear shifting mechanism pivotally connected to the struts whereby the material may be deposited on either side of the elevators.

2. In combination, a tractor, a main frame supported by the tractor, vertical struts and inclined elevators supported by the main frame on each side of the tractor, a dividing plow carried at the front end of the main frame and forwardly of the tractor, a scoop having flat inclined portions located at the lower ends of each elevator, said plow having flat portions merging into the flat portions of said scoop, gearing for operating said elevator from the traction mechanism of the tractor, a pivoted auxiliary frame carried by the struts, a horizontal conveyor supported by said auxiliary frame and disposed at the upper end of the respective elevators, means for operating the conveyor from the traction mechanism of the tractor, and gear shifting mechanism carried by the auxiliary frame whereby the material deposited on the conveyor can be thrown on either side of the elevator.

In testimony whereof I affix my signature in presence of two witnesses.

FAY C. HAYES.

Witnesses:
 ALBERT ST. JOHN,
 EARL S. CROUNSE.